United States Patent
Schunk

(10) Patent No.: US 6,546,160 B1
(45) Date of Patent: Apr. 8, 2003

(54) TRANSCEIVER FOR WAVELENGTH MULTIPLEXING PROCESSES

(75) Inventor: Nikolaus Schunk, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,970

(22) PCT Filed: Jul. 14, 1999

(86) PCT No.: PCT/DE98/01966

§ 371 (c)(1),
(2), (4) Date: Apr. 5, 2000

(87) PCT Pub. No.: WO99/21304

PCT Pub. Date: Apr. 29, 1999

(30) Foreign Application Priority Data

Oct. 21, 1997 (DE) .......................... 197 46 350

(51) Int. Cl.[7] .................. G02B 6/12
(52) U.S. Cl. .............. 385/14; 385/49; 385/24; 385/37; 359/152
(58) Field of Search ............... 385/14, 24, 37, 385/40, 45, 48, 49, 50, 129; 359/150, 173, 152

(56) References Cited

U.S. PATENT DOCUMENTS

| | | | |
|---|---|---|---|
| 5,416,629 A | * 5/1995 | Huber ..................... 359/182 |
| 5,479,547 A | * 12/1995 | Kunikane et al. ........... 385/47 |
| 5,636,309 A | * 6/1997 | Henry et al. .............. 385/129 |
| 5,657,406 A | * 8/1997 | Ball ....................... 385/24 |
| 5,786,914 A | * 7/1998 | Fielding .................. 359/124 |
| 5,796,883 A | * 8/1998 | Hamamoto et al. ........... 385/14 |
| 6,061,481 A | * 5/2000 | Heidrich et al. ........... 385/14 |
| 6,104,851 A | * 8/2000 | Mahgerefteh ............... 385/37 |
| 6,115,403 A | * 9/2000 | Brenner et al. ............ 372/102 |

FOREIGN PATENT DOCUMENTS

| | | |
|---|---|---|
| DE | 19 51 948 | 5/1970 |
| DE | 32 17 610 | 11/1983 |
| DE | 197 45 466 | 4/1999 |
| GB | 2 308 461 | 6/1997 |
| JP | 06 244797 | 11/1994 |

OTHER PUBLICATIONS

Kato et al., *Selective Area Impurity Doped Planar Edge...*, Electronic Letters, vol. 32, No. 22, pp. 207–208, 1996.

* cited by examiner

Primary Examiner—Hemang Sanghavi
Assistant Examiner—Scott A Knauss
(74) Attorney, Agent, or Firm—Kenyon & Kenyon

(57) ABSTRACT

A transceiver for use in a wavelength multiplex transmission method has an optical transmitter having a modulatable wavelength-stable laser source and a receiver, where incoming and outgoing signals each pass through at least one Michelson bandpass filter to separate the wavelengths.

6 Claims, 3 Drawing Sheets

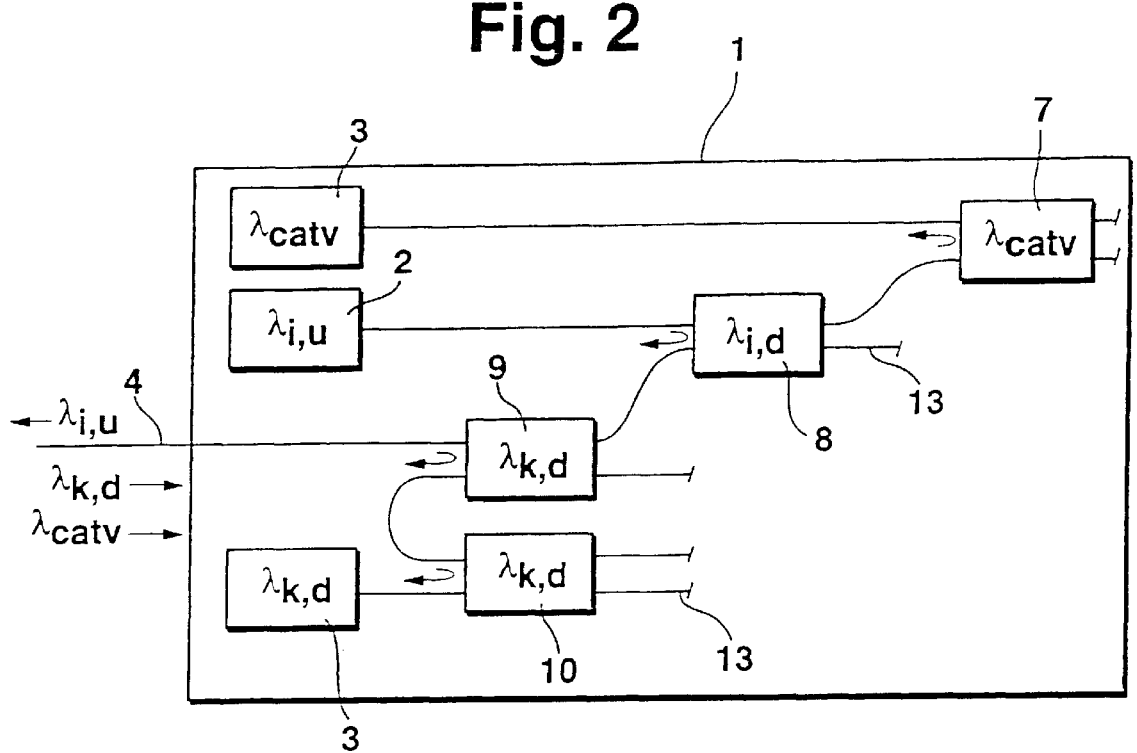
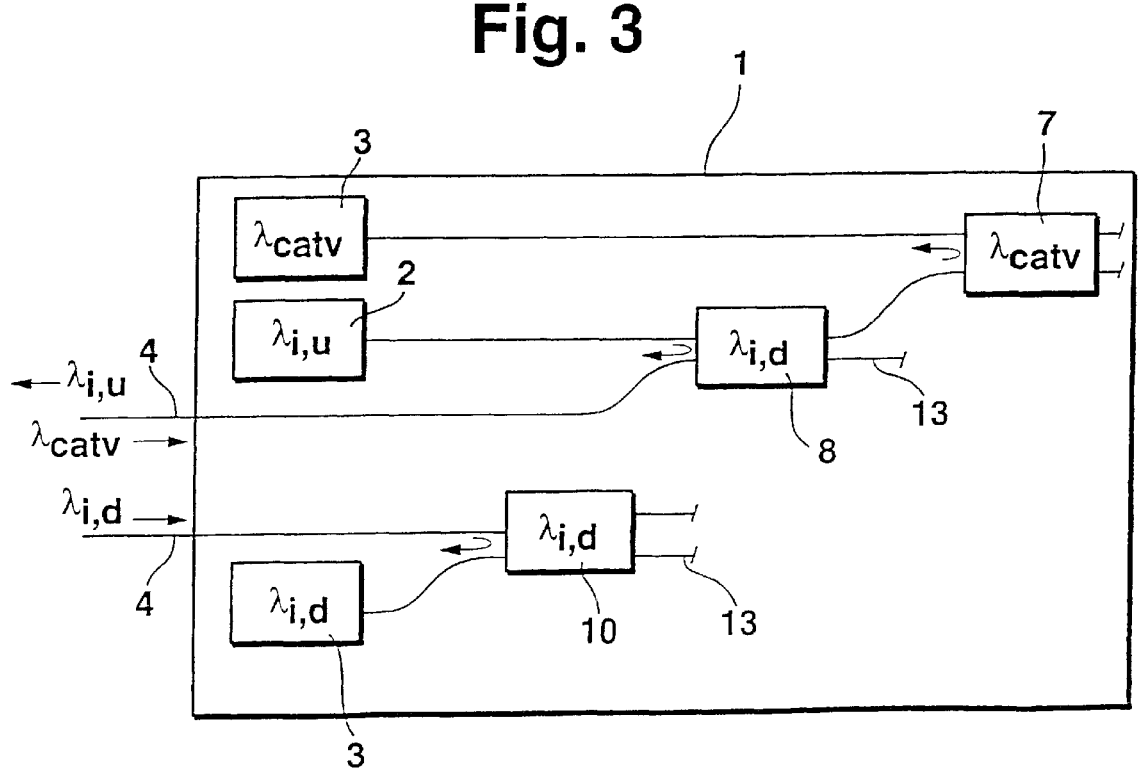

TRANSCEIVER FOR WAVELENGTH MULTIPLEXING PROCESSES

BACKGROUND INFORMATION

The present invention relates to a transceiver for use in a wavelength multiplex transmission method such as that described in German Patent No. 195 19 486 A.

British patent 2,308,461 A describes an optical transmitter having a reflective bandpass filter.

From the related art there are known transceivers having multiple inputs and outputs with glass fiber coupling for use in the wavelength multiplex transmission method. The wavelengths here are strictly separated, so there cannot be any interference in the transmitter and receiver. Influxes of wavelengths other than the intended wavelength causes interference in the transmitter, i.e., in the emitting laser source. Interference due to signals of a wavelength other than the desired wavelength on the receiving end leads to distortion of signals due to multiple signal groups being superimposed.

SUMMARY OF THE INVENTION

The transceiver according to the present invention, however, has the advantage that incoming and outgoing signals are separated by wavelength through at least one Michelson bandpass filter. Thus, both the receiver and transmitter are protected from signals of wavelengths which should not be received or transmitted by this transceiver.

A transceiver coupled into the wavelength multiplex network by an optical fiber is especially advantageous. Incoming and outgoing signals of different wavelengths are then separated through the bandpass filters in the transceiver and are sent either to the receiving photodiodes or output over the fiber in the case of the transmitter.

An advantageous embodiment has two separate optical fibers for input and output of the transceiver. This yields the advantage that the laser source can transmit on the same wavelength as the reception signal. The wavelength of the laser source need not differ from the reception wavelength as in the case of a fiber connection. An advantageous embodiment has a waveguide photodiode as the receiver, which can easily be integrated into a silicon chip, and where the received light can easily be input in the plane of the planar waveguide.

An advantageous embodiment of the transmission source is implemented with a semiconductor laser and a wavelength-selective Bragg grating which has been introduced into the planar glass waveguide structure on the silicon chip by UV light. This yields a very stable wavelength-selective source. It is also possible for the transmission source to be implemented by a glass waveguide laser.

The reflective bandpass filters are advantageously designed so that in a Mach-Zehnder interferometer structure (two series connected 3 dB couplers) the desired wavelength is reflected at the input at which the input signal is not connected through UV-induced Bragg gratings in the connecting arms of the input and output 3 dB couplers. With regard to the reflection characteristics of the UV-induced Bragg grating, this arrangement is a wavelength-selective Michelson interferometer. There is controlled processing, input or output, of transmission and reception signals. Interfering wavelengths due to wavelength crosstalk pass through cascaded bandpass filters without reflection and are drained off at the end.

BRIEF DESCRIPTION OF THE DRAWINGS

FIG. 2 shows a diagram of a transceiver having one fiber connection.

FIG. 3 shows a diagram of a transceiver having two fiber connections.

DETAILED DESCRIPTION

Figure 1:
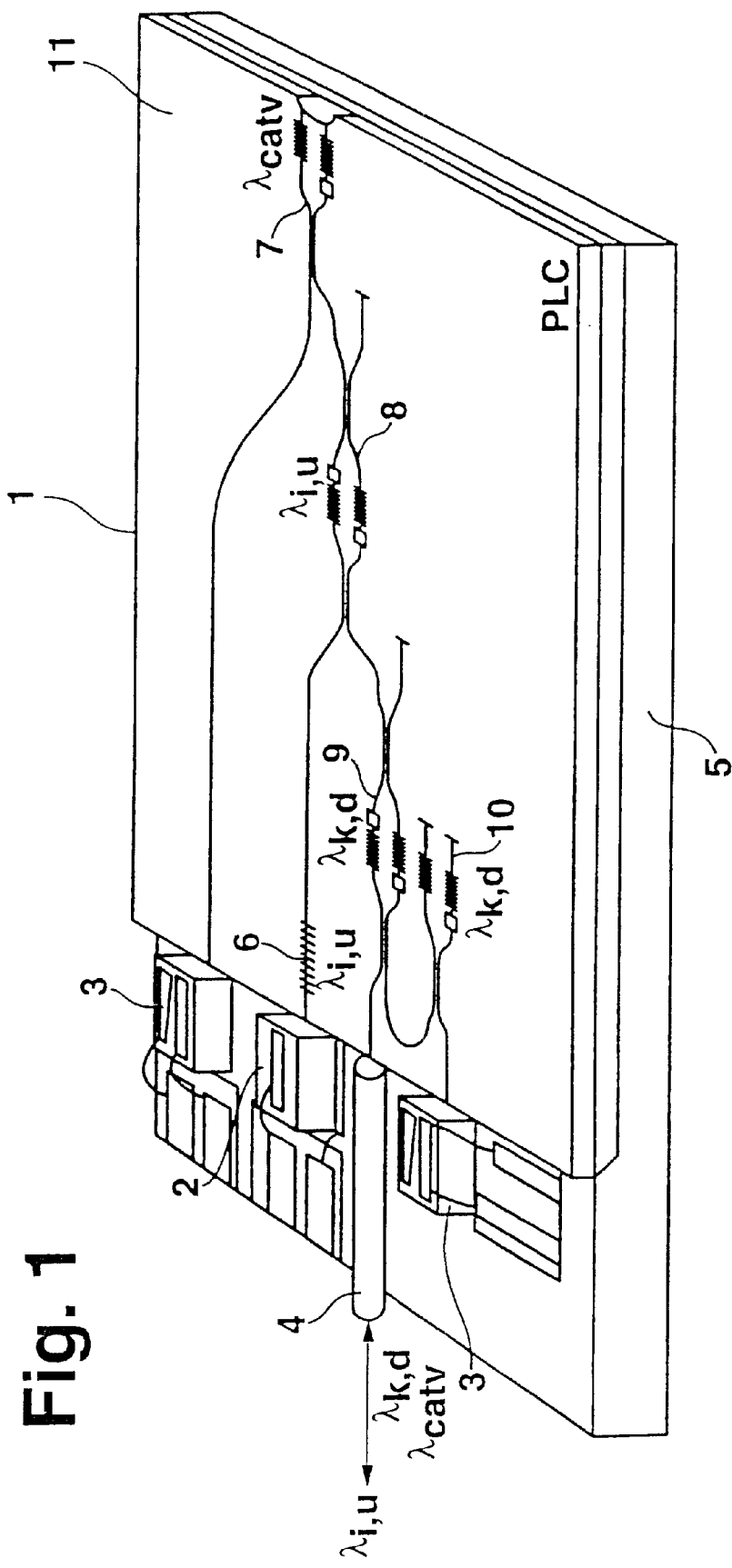
FIG. 1 shows a transceiver having one fiber connection.

FIG. 1 shows a transceiver 1 constructed on a silicon chip 5. Receivers 3 constructed on the silicon chip are connected to a glass fiber 4 over planar waveguide structures and bandpass filters 7, 8, 9 and 10. The receivers have contacts to provide electric power. A transmitter 2 whose signal is input into fiber 4 through a Bragg grating 6 and bandpass filters 8 and 9 is also constructed on silicon chip 5. The planar waveguide structure is made of doped glass in which required Bragg grating 6 and bandpass filters 7, 8, 9 and 10 are created with the aid of UV light. Bandpass filters 7, 8, 9 and 10 have a Mach-Zehnder interferometer designed as a Michelson interferometer for reflection, where only the signal having the wavelength of the UV-induced Bragg grating is reflected. The Mach-Zehnder interferometer allows all other wavelengths to pass through. The open ends are closed in a reflection-free end.

FIG. 2 shows in a schematic diagram the embodiment of FIG. 1. In this example, the transceiver receives two different signals: $\lambda_{k,d}$, which is a downstream signal and $\lambda_{catv}$, for example, which is a signal that permits television reception. The signals of the two wavelengths are fed over glass fiber 4 into transceiver 1, where they go to a first bandpass filter 9, where the signal of wavelength $\lambda_{k,d}$ is reflected. Only input signal $\lambda_{catv}$ is allowed to pass through. The signal having wavelength $\lambda_{k,d}$ is sent to bandpass filter 10 which also reflects signals of wavelength $\lambda_{k,d}$ and sends them to receiver 3. It is advantageous to design the 180° strip waveguide arc through another bandpass filter at $\lambda_{k,d}$. Bandpass filter 9 allows the other signals, e.g., the signal having $\lambda_{catv}$, to pass through to a next bandpass filter 8. This bandpass filter is used to output the signal at the transmission end and therefore also allows a signal of wavelength $\lambda_{catv}$ to pass through. This signal goes to bandpass filter 7, where it is reflected to receiver 3. Transmitter 2 emits at wavelength $\lambda_{i,u}$, i.e., it emits at a wavelength i in the upstream direction. The signal of the laser source is reflected at bandpass filter 8 and goes to bandpass filter 9, which allows it to pass through unhindered. The individual bandpass filters must be tuned very accurately to the individual reception and transmission wavelengths, so that wavelength crosstalk is prevented and has no effect on the reception signals. Open ends 13 of the bandpass filters are reflection-free ends, so that no reflected signals can influence the transceiver.

In this embodiment, it is readily possible to supply a group of wavelengths $\lambda_{k,d}$ and to separate them through bandpass filters. Such a transceiver is limited by input losses and losses in the individual bandpass filters. Modulatable sources having different wavelengths can be used as transmitters for such transceivers, e.g., those described in German Patent Application No. 19745466.6. An advantageous embodiment for the receiving diode is known from "Selective area impurity doped planar edge. . . ," Kato et al. *Electronic letters,* vol. 32, No. 22, pages 207 and 208, 1996. Such photodiodes have a large sensitive zone for the detection of signals, and at the same time they have the property that electric signals can be picked up from their surface.

Their large coupling tolerance makes them suitable for use in integrated optics due to the passive coupling technique.

FIG. 3 shows an embodiment in diagram form implemented with separate inputs for separate wavelengths. Signals of different wavelengths are input into transceiver 1 over glass fibers 4. For example, the TV signal with wavelength $\lambda_{catv}$ is input over one fiber, while signals of another wavelength $\lambda_{i,d}$ are input over the second fiber. Normal signals $\lambda_{i,d}$ are reflected at bandpass filter 10 and detected by receiver 3. Input of signals of multiple wavelengths with subsequent separation through bandpass filters is also possible with this fiber connection. The signal sent by laser diode 2 is sent at the same time over the same fiber connection as the TV image signal, for example. The signal sent by the laser diode is reflected by bandpass filter 3 and output over fiber 4. At the same time, bandpass filter 8 allows incoming wavelength $\lambda_{catv}$ to pass through which is then reflected at bandpass filter 7 and detected by receiver 3. The open ends of the bandpass filters are each designed to be reflection-free. This freedom from reflection can be achieved, for example, by passing the open ends along the edge of the transceiver which is rough or beveled. It is also possible to have the open ends end in a wave sump.

Figure 4:
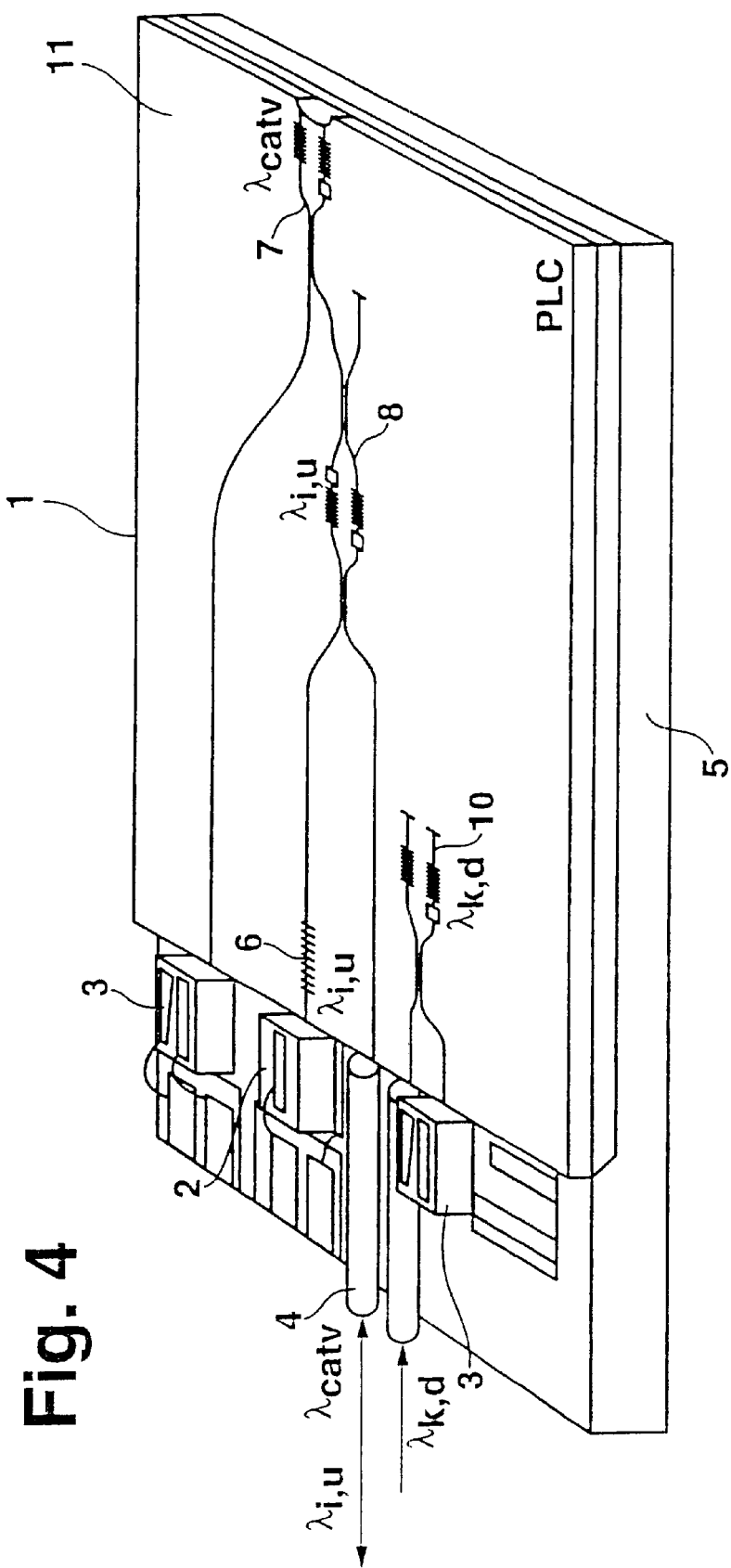
FIG. 4 shows a transceiver having two fiber connections.

FIG. 4 shows the embodiment having two fiber connections with the same notation as in FIG. 1. This embodiment has the advantage that the transmission wavelength ($\lambda_{i,u}$) and the reception wavelength ($\lambda_{k,d}=\lambda_{i,u}$) may be the same. In constructing a wavelength multiplex network, this has the advantage that per transceiver, the same wavelength can be used for the transmission and reception paths.

In this embodiment it is also possible to receive multiple signals of different wavelengths over both fiber connections, then separate them through reflective bandpass filters.

What is claimed is:

1. A transceiver for use in a wavelength multiplex transmission procedure, comprising:
    an optical transmitter having a modulatable wavelength-stable laser source, wherein the laser source includes a semiconductor laser and a wavelength-selective Bragg grating;
    a receiver, and
    a plurality of reflecting Michelson bandpass filters, incoming signals and outgoing signals each passing through at least one of the plurality of reflecting Michelson bandpass filters to separate wavelengths, wherein:
        a signal generated by the semiconductor laser is transmitted from an output via the wavelength-selective Bragg grating and at least one of the plurality of Michelson bandpass filters.

2. The transceiver according to claim 1, further comprising an optical fiber, the incoming and outgoing signals having different wavelengths and being input and output over the optical fiber.

3. The transceiver according to claim 1, further comprising at least two separate optical fibers, the incoming and outgoing signals having a same wavelength and being input and output over the at least two separate optical fibers.

4. The transceiver according to claim 1, wherein the receiver is constructed on a silicon substrate as a waveguide photodiode.

5. The transceiver according to claim 1, wherein the at least one filter includes Mach-Zehnder interferometers and has reflection-free ends.

6. The transceiver according to claim 5, wherein the interferometers are Michelson interferometers with regard to wavelength-selective transmission.

* * * * *